(12) United States Patent
Meriheinae et al.

(10) Patent No.: US 9,105,197 B2
(45) Date of Patent: Aug. 11, 2015

(54) TOOTHBRUSH MONITORING DEVICE (75) Inventors: Ulf Meriheinae, Soerderkulla (FI); Ossi Kauppinen, Vantaa (FI); Teijo Viljanen, Espoo (FI); Juha-Pekka Puurunen, Lapinlahti (FI)

(73) Assignee: BRUSHGATE OY, Helsinki (FI)

( * ) Notice: Subject to any disclaimer, the term of this patent is extended or adjusted under 35 U.S.C. 154(b) by 85 days.

(21) Appl. No.: 13/816,422

(22) PCT Filed: Aug. 5, 2011

(86) PCT No.: PCT/FI2011/050690
§ 371 (c)(1),
(2), (4) Date: Feb. 11, 2013

(87) PCT Pub. No.: WO2012/020165
PCT Pub. Date: Feb. 16, 2012

(65) Prior Publication Data
US 2013/0137074 A1 May 30, 2013

(30) Foreign Application Priority Data

Aug. 11, 2010 (FI) .................................. 20105846

(51) Int. Cl.
*G09B 19/00* (2006.01)
*A46B 15/00* (2006.01)
(52) U.S. Cl.
CPC ........ *G09B 19/0084* (2013.01); *A46B 15/0006* (2013.01); *A46B 2200/1066* (2013.01)
(58) Field of Classification Search
CPC ............................. A61C 17/00; A46B 15/0006
USPC ................................. 434/236; 15/22.1, 32, 34
See application file for complete search history.

(56) References Cited

U.S. PATENT DOCUMENTS

| | | | |
|---|---|---|---|
| 6,536,068 B1 | 3/2003 | Yang et al. | |
| 6,786,732 B2* | 9/2004 | Savill et al. | 434/263 |
| 8,272,091 B2* | 9/2012 | Hwang et al. | 15/22.1 |
| 2007/0190509 A1* | 8/2007 | Kim | 434/263 |
| 2009/0038639 A1 | 2/2009 | Yetukuri et al. | |
| 2009/0092955 A1* | 4/2009 | Hwang | 434/263 |

(Continued)

FOREIGN PATENT DOCUMENTS

| | | |
|---|---|---|
| DE | 10154946 A1 | 5/2003 |
| DE | 102007053802 A1 | 5/2009 |
| WO | 2006137648 A1 | 12/2006 |

(Continued)

OTHER PUBLICATIONS

International Search Report for Finnish Application No. 20105846, 2 pages.
Charles Allen et al., An instrument for measuring toothbrushing force using PIC microcontroller technology, copyright 1995 IEEE, pp. 861-866.

(Continued)

*Primary Examiner* — Bruk Gebremichael
(74) *Attorney, Agent, or Firm* — Christopher Paradies; Paradies Law P.A.

(57) ABSTRACT

The invention relates to a toothbrushing monitoring device (18). In order to obtain an efficient monitoring device, the monitoring device comprises: an input device (21), an acceleration sensor, a signal conditioner, a memory, a comparator which compares the numbers of brushing cycles registered by each teeth surface specific counter during brushing with corresponding reference values maintained in said memory, and an output device (27) which indicates that the brushing of the teeth region (L-U) in question is accepted.

13 Claims, 4 Drawing Sheets

(56) References Cited

U.S. PATENT DOCUMENTS

2009/0291422 A1* 11/2009 Puurunen et al. ............. 434/263
2009/0320227 A1 12/2009 Cohen et al.

FOREIGN PATENT DOCUMENTS

| WO | 2009141489 A1 | 11/2009 |
| WO | 2012020165 A1 | 2/2012 |

OTHER PUBLICATIONS

Kang-Hwi Lee et al., Tooth brushing Pattern Classification using Three-Axis Accelerometer and Magnetic Sensor for Smart Toothbrush, copyright 2007 IEEE, pp. 4211-4214.

Yu-Chen Chang et al., Playful Toothbrush: UbiComp Technology for Teaching Tooth Brushing to Kindergarten Children, copyright 2008 ACM, pp. 363-372.

* cited by examiner

TOOTHBRUSH MONITORING DEVICE

BACKGROUND OF THE INVENTION

1. Field of the Invention

This invention relates to a device for monitoring the use of a toothbrush in order to give the user feedback about brushing.

2. Description of Prior Art

Previously there are known toothbrushes with monitoring devices which give users feedback about the brushing result. Such devices may employ acceleration sensors, timers, and pressure sensors, for instance, in order to obtain measurement data during toothbrushing.

However, to determine the brushing result, in other words how well the user has succeeded with toothbrushing, has turned out to be a challenging task. In addition, the costs and the of the device used need to be kept within reasonable limits.

Improvements can still be made regarding the accuracy and device costs of known monitoring devices.

SUMMARY OF THE INVENTION

An object of the present invention is to provide an improved monitoring device for determining the result of toothbrushing. This object is achieved with a monitoring device according to independent claim 1.

This monitoring device utilizes the possibility of identifying the teeth surface that is being brushed within a teeth region on the basis of the inclination of the toothbrush as compared with the earth's gravitation during brushing cycles. By registering the number of brushing cycles with teeth surface specific registers, information is obtained about the number of brushing cycles each teeth surface within the teeth region is subjected to. The registered number of brushing cycles may then be compared with teeth surface specific reference values in order to evaluate how well the toothbrushing has succeeded. The result is a monitoring device that provides a cost-effective, space and energy saving solution for reliably monitoring toothbrushing.

BRIEF DESCRIPTION OF DRAWINGS

In the following, the present invention will be described in closer detail by way of example and with reference to the attached drawings, in which.

DESCRIPTION OF AT LEAST ONE EMBODIMENT

Figure 1:
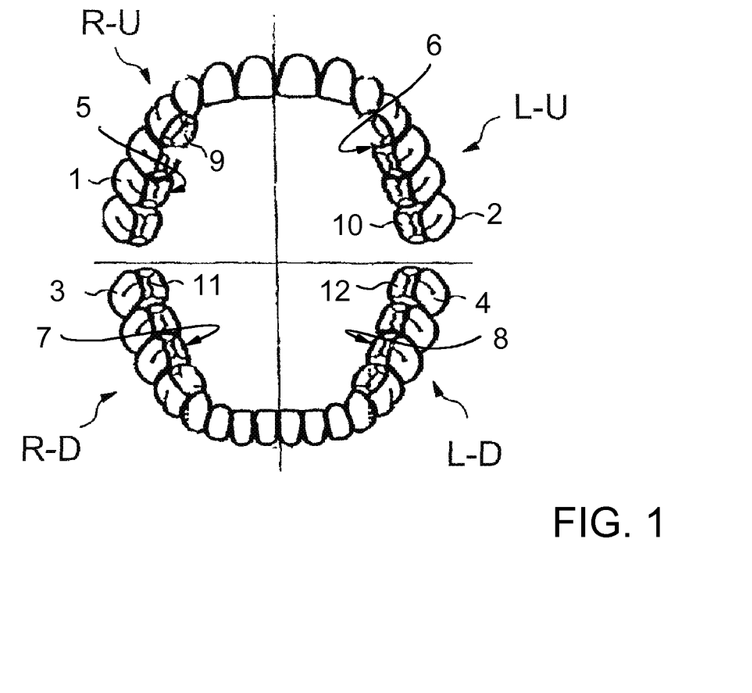
FIG. 1 illustrates teeth regions in one embodiment.
Figure 2:
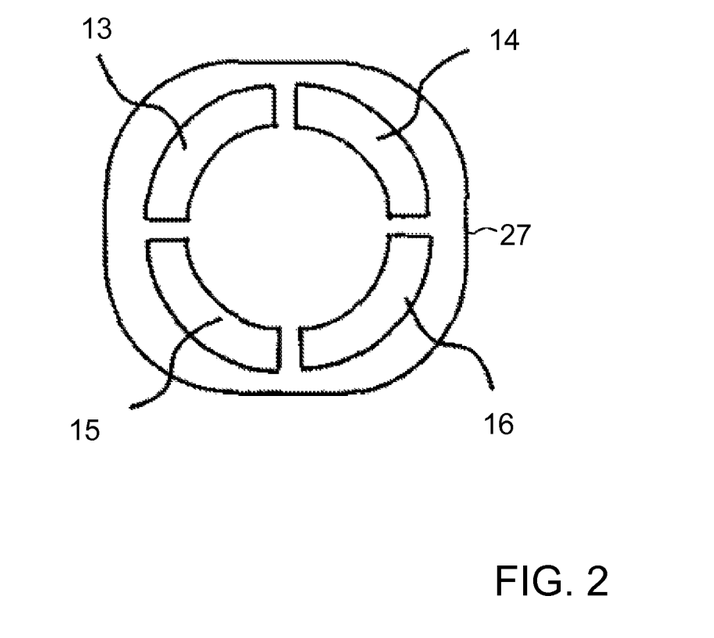
FIG. 2 illustrates an embodiment of an output device.

FIG. 1 illustrates teeth regions in one embodiment and FIG. 2 illustrates an embodiment of an output device 27.

In the embodiment of FIG. 1, the teeth have by way of example been divided into four teeth regions R-U, L-U, R-D, and L-D. The teeth regions, in this case quarters, may be identified as left-up L-U, left-down L-D, right-up R-U, and right-down R-D. In many cases, sufficient feedback may be given to the user of a toothbrush by indicating that one (or more) of these four regions has (have) not been brushed thoroughly enough.

In an embodiment, each of the four teeth regions R-U, L-U, R-D and L-D comprises three predefined teeth surfaces that need brushing. In FIG. 1, each region therefore comprises an outer surface 1 to 4, an inner surface 5 to 8, and a masticating surface 9 to 12.

In the following examples, the user brushes the teeth by brushing the four teeth regions R-U, L-U, R-D, and L-D in a predetermined order, or alternatively, by indicating to the monitoring device which region is presently being brushed. The monitoring device consequently knows the teeth region that is being brushed. However, the user may brush the teeth surfaces 1, 5, 9; 2, 6, 10; 3, 7, 11; or 4, 8, 12 within one teeth region R-U, L-U, R-D, and L-D in any desired order, even by switching several times between the inner, outer and masticating surfaces while brushing the specific teeth region.

The output device utilized in the monitoring device may indicate the brushing result to the user in any convenient manner, which makes it possible for the user to determine whether or not the brushing of a teeth region R-U, L-U, R-D or L-D has been accepted. Such an output device may include at least one of the following: a LED (Light Emitting Diode), a sound generator for producing sounds or music, and a speech generator. The output device may be physically located in a module moving together with a toothbrush, or alternatively such a module may include a wired or wireless data transmitting interface for transmitting data to an external output device that indicates the result of the brushing to the user.

In the example of FIG. 2, it is by way of example assumed that the output device 27 may include LEDs or an LCD display with one sector 13 to 16 for each teeth region shown in FIG. 1. If sector 13 is illuminated in red on the output device of FIG. 2 after brushing, the user understands that region R-U of FIG. 1 requires a more thorough brushing, for instance. Similarly, if another sector 14 is illuminated in red on the output device of FIG. 2 after brushing, the user understands that region L-U of FIG. 1 requires a more thorough brushing, for instance. An acceptable brushing may be indicated by illuminating in another colour, such as green, for example. Alternatively, other colours and ways of illuminating the indicator may be utilized in order to provide the user with feedback, such as a flashing versus steady mode light, lit versus unlit, and the like.

If LEDs are used in the output device 27, the output device may include one pair of LEDs for each teeth region. In such a case, each pair of LEDs includes a LED of a first colour to indicate successful brushing of that quarter and a LED of a second colour to indicate an unsuccessful brushing of that quarter.

Figure 3:
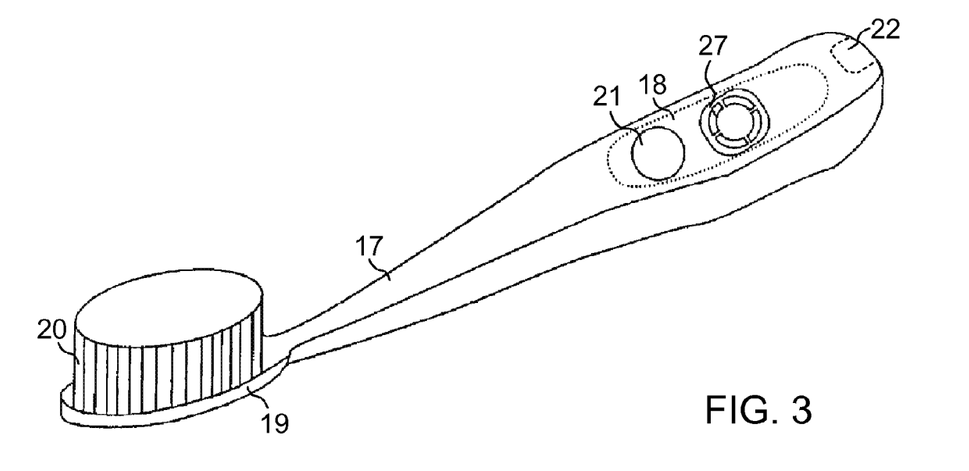
FIG. 3 illustrates an embodiment of a toothbrush with a monitoring device.
Figure 4:
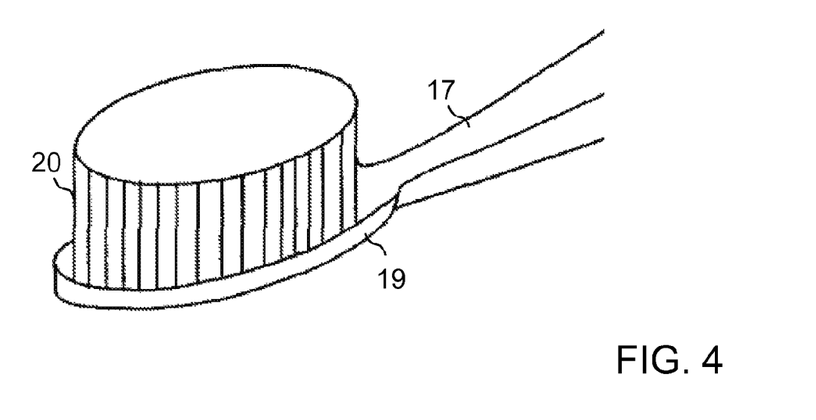
FIG. 4 illustrates a coordinate system.

FIG. 3 illustrates an embodiment of a toothbrush 17 with a monitoring device 18 and FIG. 4 illustrates a coordinate system XYZ for a brush head 19 of such a toothbrush.

In the embodiment of FIG. 3, the monitoring device 18 has been produced as a separate module containing the necessary electronic components and a battery, which has been embedded into a shaft of a manual toothbrush 17. In this way, bristles 20 of the brush head 19 move with the brush head 19, and the monitoring device 18 moves with each movement of the brush head. However, this is only one example as to how a monitoring device 18 may be arranged in a toothbrush. Alternatively, the monitoring device may be an extension of the shaft of the toothbrush or connected to the toothbrush in some other way. The brush head 19 may be detachable from the handle of the toothbrush 17 in order to facilitate that different persons with their own brush head use the same toothbrush 17 handle.

In FIG. 3, the monitoring device is by way of example provided with an input device 21, such as a push button, and an output device 27, as illustrated in FIG. 2. The input device may, however, be located in a separate apparatus not shown in FIG. 3, in which case the monitoring device may include a wired or wireless data transmission interface 22 for receiving signals from the separate input device.

For the sake of clarity, in FIG. 4 the direction of the X-axis is generally the same as the direction of the bristles 20 in the brush, the direction of the Y-axis is perpendicular to the X-axis and generally the same as the longitudinal direction of the brush head 19, which in the illustrated example is the direction of the centre line of the tubular body of the toothbrush 17, and the Z-axis is generally directed sideways from the brush head, thus forming a 90° angle with the X- and Y-axes. It should, however, be observed that the exact directions of the axes are not important to the monitoring device as such, but they are defined solely to enable the following example to be understood.

Figure 5:
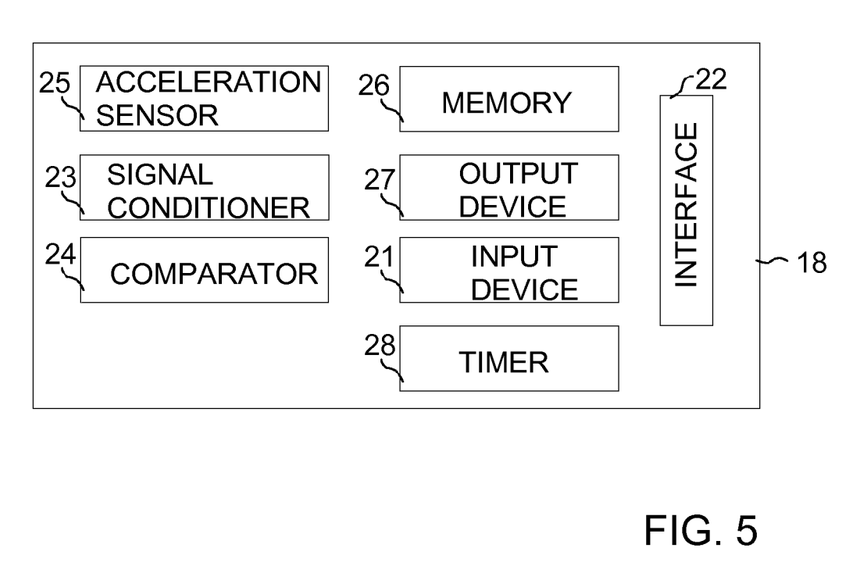
FIG. 5 is a block diagram illustrating an embodiment of a monitoring device.

FIG. 5 is a block diagram illustrating an example of a monitoring device 18. The monitoring device may be integrated into a toothbrush, such as in FIG. 3, or alternatively consist of a separate component that is attached to a toothbrush. As a separate component, the monitoring device may be detached from a first toothbrush and attached to another toothbrush. In such a case, the monitoring device may be part of an interchangeable toothbrush handle.

In this example, the monitoring device comprises a signal conditioner 23 controlling the operation of the monitoring device 18. The signal conditioner 23 and a comparator 24 may be implemented with circuitry, a computer programme or a combination of a computer programme and circuitry. In the last two cases, a processor running on a computer may carry out the tasks of the signal conditioner 23 and/or the comparator 24 under control of software. The computer may be a stand-alone processor, e.g. incorporated into a base device, or a general purpose computer. The signal conditioner and the comparator may therefore physically consist of one single part.

The signal conditioner 23 carries out low-pass and high-pass filtering, with one or more digital filters, for instance. At least one of the filters may be of a type: $y(t)=y(t-1)*(1-1/k)+x(t)/k$, where $y(t)$ is output at time step t, $x(t)$ is input at time step t, and k is a filter factor respectively. At least one of the filters may also be of a type: $z(t)=x(t)-y(t)$, where $z(t)$ is output at time step t, $x(t)$ is input at time step t, and $y(t)$ is a low-pass-filtered signal, respectively.

An acceleration sensor 25 is coupled to the device for measuring toothbrushing patterns. A three-axis acceleration sensor 25 may be utilized to detect the inclination of the toothbrush during use, such as the angles at which the toothbrush and the monitoring device attached to the toothbrush are held during use as compared with the gravity of the earth. In another example, the three-axis acceleration sensor 25 measures toothbrushing cyclic and/or non-cyclic motion. The acceleration sensor may be a CMA3000 available from VTI Technologies Oy, P.O. Box 27, FI-01621 Vantaa, Finland, for example. The output of a three-axis acceleration sensor may be expressed as:

$$a_{measured}=a+g+a_\epsilon \quad (1)$$

where the output measured vector ($a_{measured}$, three components) corresponds to the sum of the acceleration (a) of an object, the gravitation vector (g), and an error term ($a_\epsilon$) all in the local coordinate system of the brushing monitoring device From equation (1), an acceleration sensor may be used to measure both inclination (when the change in velocity a is known) and acceleration (when the gravitational acceleration in a brush frame is known). No additional cost-increasing and space-consuming sensor components are necessary to track the movement or position of a toothbrush, therefore the monitoring device may include a three-axis acceleration sensor 25 as the only sensor. One advantage of a device using only an acceleration sensor is that the costs to produce the device are reduced. Another advantage is that using an acceleration sensor with no other displacement orientation or position sensors saves space. Compared with some other approaches, a third advantage is the ultra-low power consumption.

In measurements carried out with the monitoring device 18, acceleration is assumed to be noise disturbing the inclination or angle measurements. During toothbrushing, the acceleration sensor 25 may measure toothbrushing patterns, which may be recorded or supplied as data to the comparator 24. The comparator 24 may also receive toothbrushing pattern reference data, in other words reference values, from a memory 26. The memory 26 may be a recording device that is coupled with the acceleration sensor 25 and/or the signal conditioner 23 for retaining pattern reference data. The signal conditioner 23 may perform low- and high-pass filtering functions as well as level triggering functions on the acceleration data to obtain relevant brushing pattern data and parameters.

For example, tooth-brushing pattern reference data or reference values, stored in the memory 26, may be compared with data produced during a normal, daily use of a toothbrush once the use of the toothbrush has finished. In one example of toothbrushing pattern reference data, the toothbrushing pattern reference data may also indicate the time used (seconds, for instance) for brushing each teeth region, the number of brushing cycles per teeth region, and the brushing order (transfer from one position to another). The comparison between tooth brushing pattern data during use with the toothbrushing pattern reference data or reference values is used for giving feedback to the user by the output device 27. The monitoring device 18 may be configured to automatically inform the user about the results of the brushing, using a LED, a plurality of LEDs, or a display by indicating the result for a predetermined time period after the brushing has completed, as determined by a timeout, return to a base, or a switch, for example.

Instead of a visual indicator, the output device 27 may consist of an indicator which produces sound, such as a buzzer producing a predetermined beep, or a speech generator producing instructions after toothbrushing. Such a buzzer or speech generator may be used to indicate either a successful or unacceptable brushing. In this way, the user may be provided with immediate feedback about the brushing.

In some embodiments, the monitoring device of FIG. 5 may include a timer 28 to measure the duration of brushing in a specific teeth region. This enables a comparison to be carried out with a reference value representing a reference duration as to whether or not the user has brushed a teeth region for long enough.

The monitoring device 18 of FIG. 5 may also include an interface 22 for forwarding the result of the comparison to a remote device where the output device 27 and/or a separate brushing data storage unit is located. Consequently, the user may be given feedback by an output device located locally in connection with the signal conditioner and the comparator, or alternatively by an output device that is remotely located, or via both local and remote output devices.

In the case of a wired interface to a remote device, the interface 22 may include electrical contacts, which are used by the monitoring device 18 for communication with the remote device. Alternatively, in the case of a wireless interface, the interface 22 may include a radio transmitter for transmitting the measurement result via a radio path to the remote device.

The monitoring device 18 also includes an input device 21 for receiving user inputs, like a push button for user inputs for example for selecting a mode (e.g. teaching, brushing, memory scrolling) or indicating the start or stop of events. Such inputs may be used for setting the monitoring device 18 into a teaching mode, which may be used for collecting the user's own preferred brushing pattern data. The first mode may be continuous, meaning that data is stored as reference values continuously, including the toothbrushing patterns measured, or it may be used to store data selectively. Selective data may be used under dental hygienist, dentist or parental supervision to insure adequate brushing, for example. After actuation of the input device 21, the acceleration sensor 25 is configured to measure and forward toothbrushing pattern data (for example, data relating to an inclination of a toothbrush) to the signal conditioner 23, which may process it and store it in the memory 26 for subsequent use during use of the toothbrush.

The acceleration sensor 25 measures toothbrushing patterns for comparison with reference data when the monitoring device 18 is in a second mode. The teaching mode allows the user to store individual toothbrushing pattern reference data in the memory 26 as reference values. For example, after pressing the input device 21, the user uses the toothbrush to brush his or her teeth as thoroughly as desired. A second actuation of the input device 21 may end the first mode. The result is that toothbrushing pattern reference data indicating angles at which this particular user holds the toothbrush during use is stored in the memory 26 as preferred toothbrushing pattern reference data or reference values. In addition, the reference data may also indicate the time used, the number of brushing cycles, and the brushing order (transfer from one position to another). This individual toothbrushing pattern reference data may be used for analyzing how thoroughly this particular user will brush his or her teeth in the future during daily use. The first mode therefore allows the user to take into account individual behaviour (the toothbrush or the user's head is held at individual angles, for instance) while brushing the teeth.

Above it is by way of example assumed that the monitoring device produces and stores the toothbrushing pattern reference data in the memory once the monitoring device 18 is set to the teaching mode and the toothbrush is being used. However, an alternative to this is that predefined toothbrushing pattern reference data is produced in an external device and copied to the memory 26 of the monitoring device 18 for subsequent use as reference data or reference values while the monitoring device is utilized during daily toothbrushing.

When the toothbrushing monitoring device 18 is used in daily use, a comparison may be made with the reference data maintained in the memory 26 of the monitoring device 18. Additional reference data may be recorded to replace or aggregate with the first reference data. Such toothbrushing patterns may be stored either individually or collectively as toothbrushing pattern reference data in a recording device. For example, a user, in one particular brushing session, may store the produced toothbrushing patterns in the recording device as reference data. Alternatively, the user may add such reference data to a cumulative toothbrushing pattern reference data.

Individual toothbrushing pattern reference data may be stored for a plurality of persons in the memory 26 of the monitoring device 18. In one example, an identifier of the person who used the toothbrush during the teaching mode is stored in the memory together with the toothbrushing pattern reference data. In one example, this identifier is associated with an individual's brush head 19 on a device having one detachable brush head for each individual user. This is advantageous when several persons use the same toothbrush or actually the same handle of a toothbrush (with their own personal attachable brush parts, such as a brush head). In such a case, the monitoring device 18 may be able to automatically identify the person using the toothbrush by selecting from the memory 26 the toothbrushing pattern reference data that best matches the data produced during the use of the toothbrush. Alternatively, the toothbrush may include an interface which allows the user the ability to enter his or her identifier, or the identifier is coded in the brush head interface in order for the monitoring device 18 to be able to select the correct toothbrushing pattern reference data from the memory 26. The input device 21 may be used as such an interface.

The monitoring device 18 may be configured to auto-calibration on the basis of the sum of low-pass-filtered acceleration vector sum $a=\sqrt{(axlp^2+aylp^2+azlp^2)}=1$ g, where axlp, aylp and azlp are the low-pass-filtered acceleration components in orthogonal directions x, y, and z in the brush coordinate system respectively.

All parts of the monitoring device 18 may be encapsulated with each other and/or integrated into or attached to the body of an electrical or manual toothbrush. Alternatively, a radio transmitter may be arranged separately from the other parts, for instance, in a battery charger, cradle or base of the electrical toothbrush. In such an example, the interface may include contact terminals in the toothbrush which are connected to the corresponding terminals in the battery charger for forwarding the result of the comparison via a wired connection to the transmitter in the battery charger or by induction or short range wireless communications. The radio transmitter in the battery charger then transmits this comparison result further via the wireless radio connection to the remote device.

Figure 6:
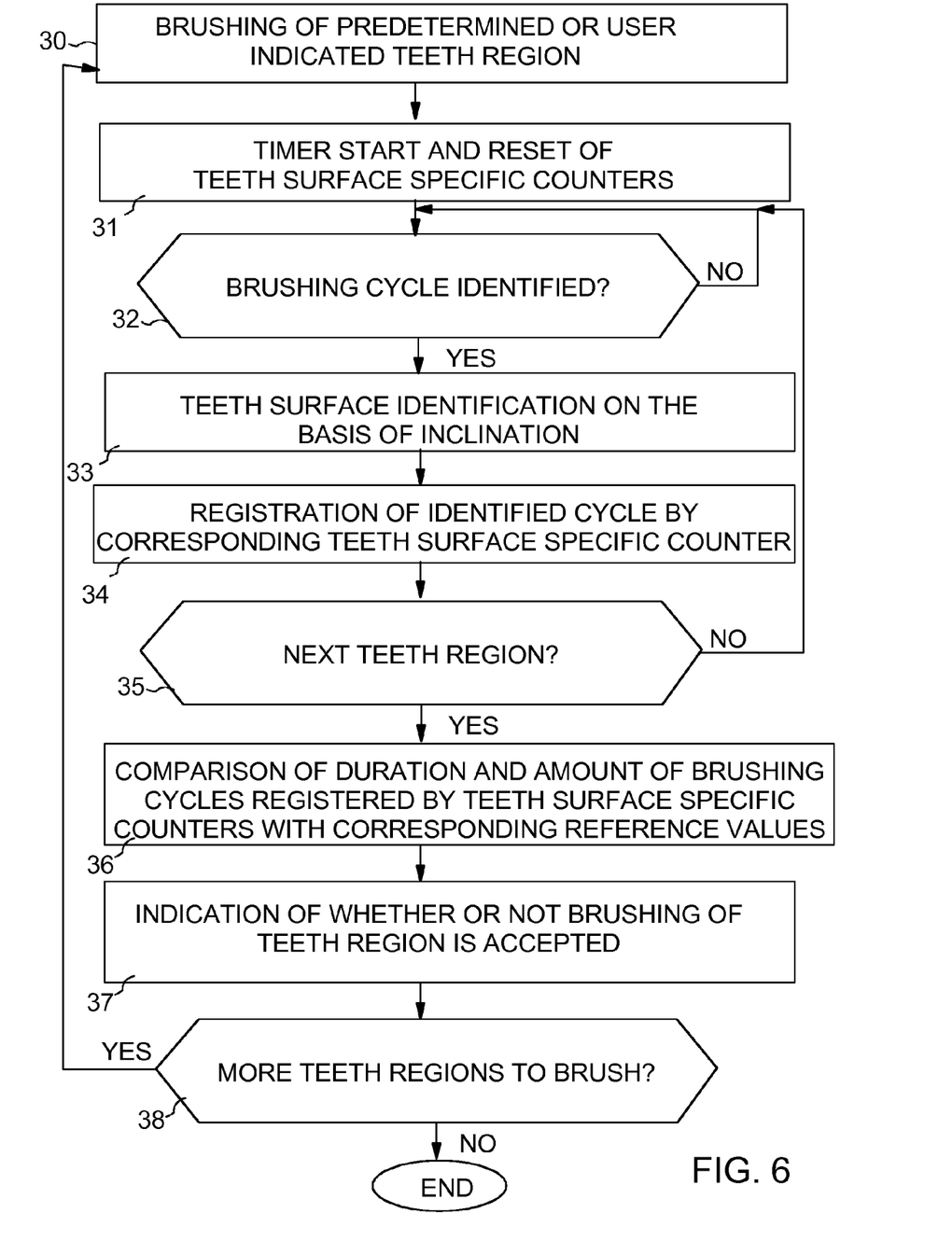
FIG. 6 is a flow chart illustrating operation of a monitoring device.

FIG. 6 is a flow chart illustrating operation of a monitoring device.

In step 30, the user starts to brush a predetermined teeth region or a teeth region indicated by the user. The alternatives are, for instance, that the teeth regions are always brushed in the same order, that the monitoring device for each new teeth region indicates by the output device 27 which region should be brushed, or that the user by using the input device 21 indicates the teeth region R-U, L-U, R-D or L-D that will be brushed. In any case, the monitoring device 18 knows the teeth region that is being brushed, which in this example is assumed to be region L-U.

In this example, it is assumed that a timer 28 is used to measure a brushing duration for a teeth region, e.g. how many seconds the user spends brushing the region in question, although a timer is not necessary in all embodiments. If a timer is used, an alternative is to use three timers, one for each surface of a teeth region. Consequently, in step 31 the timer 28 is initiated and started and the teeth surface specific counters are initiated (such as set to zero). In the following explanation, it is by way of example assumed that three teeth surface specific counters are provided, one for the outer teeth surface 2, one for the inner teeth surface 6, and one for the masticating surface 10.

In step 32, the acceleration sensor 25 produces signals that the signal conditioner 23 receives and processes. The signal conditioner 23 low-pass-filters the signals (ax, ay, az) to eliminate noise and acceleration hazards. In addition the acceleration signal is strongly low-pass-filtered, which gives a signal with no acceleration but only with earth's gravity and acceleration sensor offset and gain error. Maximum and minimum values of this signal are used to auto-calibrate sensor parameters of the three axes X, Y and Z (1 g=9.81 m/s2=free fall acceleration in earth's gravity field) as follows:

$ax0(=\text{offset})=(ax\text{max}+ax\text{min})/2$ is calibrated to 0g, $ax\text{gain}=(ax\text{max}-ax\text{min})/2$ is calibrated to 1g, $ay0(=\text{offset})=(ay\text{max}+ay\text{min})/2$ is calibrated to 0g, $ay\text{gain}=(ay\text{max}-ay\text{min})/2$ is calibrated to 1g, $az0(=\text{offset})=(az\text{max}+az\text{min})/2$ is calibrated to 0g, and $az\text{gain}=(az\text{max}-az\text{min})/2$ is calibrated to 1g.

Now, during brushing, the X and Z components of the strongly low-pass-filtered signal directly give the inclination of the brush in earth's gravity field. The Y acceleration is then high-pass-filtered by subtracting the strongly low-pass-filtered signal from the original one (ayhp=ay−aylp). For this signal threshold levels are set. Once a positive threshold is crossed and a negative one as well within a predetermined time limit, a brushing cycle is identified in step 32. In this example a specific acceleration, a double level crossing, in other words two Y accelerations in opposite directions within a specified time frame, indicates a brushing cycle. At this stage step 33 is entered where the current strongly low-pass-filtered X and Z components are analyzed. These components are used in step 33 to determine which teeth surface 2, 6, or 10 was brushed with the identified brushing cycle. The memory of the monitoring device maintains a sample X and Z pair for each teeth surface 2, 6, and 10 of the teeth region L-U (and also for all other teeth regions). Therefore, the brushed teeth surface is determined to be the one whose sample X and Z pair best matches the current strongly low-pass-filtered X and Z components. The teeth surface specific counter of the identified teeth surface is used to register the brushing cycle for the identified teeth surface 2, 6 or 10 in step 34, for instance by incrementing the counter with one. Physically the teeth surface specific counters may be implemented as predetermined memory locations in memory 26.

In step 35, a check is made to determine if brushing of the same teeth region L-U continues, or if the monitoring device has signalled to the user that brushing of the teeth region should end (for instance by indicating with the output display that the brushing of teeth region L-U is accepted), or if the user has used the input device 21 to indicate that the brushing of the teeth region has ended.

Once eventually it is determined in step 35 that the brushing of the current teeth region has ended, step 36 is initiated. In step 36, the comparator 24 compares the registered number of brushing cycles for each teeth surface specific counter with the corresponding reference values in the memory 26. In addition, although not necessary in all embodiments, in this example the timer 28 is checked to determine the duration of the brushing of the teeth region L-U with a corresponding reference value in the memory 26. If all the teeth surface specific counters have registered a number of brushing cycles that with a sufficient accuracy corresponds to the reference values, and in this example, also the brushing duration with a sufficient accuracy corresponds to the reference value in the memory 26, it is indicated by the output device 27 in step 37 that the brushing of teeth region L-U has been accepted. Otherwise it is indicated in step 37 by the output device 27 that the brushing of teeth region L-U has not been accepted.

The sufficient accuracy required in the comparison in order to accept the brushing result depends on the implementation. One alternative is that if all teeth surface specific counters register a number of brushing cycles which is at least 60 to 80% of the reference value for the teeth surface in question, and similarly the duration (if used) of brushing as measured by the timer is at least 60 to 80% of the corresponding reference value, the brushing of the teeth region in question can be accepted.

Finally, in step 38, it is determined whether or not teeth regions still remain that need brushing. If not, the process may end. Otherwise, steps 30 to 38 are repeated for a following teeth region.

In addition to the previously described features, the monitoring device may also utilize the output device 27 to indicate for the user when the toothbrush has been worn out and consequently reached an end of life. In this way the user may be informed of when to purchase a new toothbrush or toothbrush head. One alternative to obtain such information is that the monitoring device is configured to count the number of total accumulated toothbrushing cycles, and to indicate with the output device 27 that the end of life of the toothbrush has been reached once a brush specific preset reference number of toothbrushing cycles has been reached. In case of an embodiment where the same monitoring device can be used with another toothbrush or toothbrush head, the user may in this case be given an opportunity to reset the count of the accumulated toothbrushing cycles once the toothbrush or toothbrush head has been renewed.

Alternatively the monitoring device may be configured to compare a present brushing acceleration spectral distribution to a brush specific preset reference distribution, and to indicate with the output device 27 an end of life of the toothbrush based on said comparision.

It is to be understood that the above description and the accompanying figures are only intended to illustrate the present invention. It will be obvious to a person skilled in the art that the invention can be varied and modified without departing from the scope of the invention.

The invention claimed is:

1. A tooth brushing monitoring device for use with a toothbrush during tooth brushing, said monitoring device comprising:
    an input device for taking user inputs,
    an acceleration sensor for producing signals during tooth brushing,
    a signal conditioner receiving and processing the signals from the acceleration sensor, said signal conditioner, while said toothbrush and monitoring device is used for brushing a predetermined or user indicated teeth region comprising a plurality of predefined teeth surfaces, identifies a brushing cycle based on a specific acceleration of a brush head of said toothbrush in a longitudinal direction of said brush head, and in response to an identified brushing cycle, said signal conditioner identifies the predefined teeth surface that was brushed with the identified brushing cycle based on an inclination of the monitoring device in gravity during the identified brushing cycle, and registers the identified brushing cycle of the predefined teeth surface with a corresponding teeth surface specific counter, a memory for maintaining at least one teeth surface specific reference value for each predefined teeth surface of each teeth region, a comparator which compares a number of brushing cycles registered by each of the teeth surface specific counters during brushing of the teeth region with the corresponding teeth surface specific reference values maintained in said memory, and an output device which indicates that the brushing of the teeth region in question has been accepted, if the comparator indicates that the number of brushing cycles registered by each teeth surface specific counter during the brushing of the teeth region in question corresponds with a predefined accuracy with the corresponding reference values for the teeth region in question, wherein said longitudinal direction of said brush head defining a Y-axis, a direction of bristles of said brush head defining an X-axis, which is perpendicularly oriented as compared to the Y-axis, and a Z-axis is perpendicularly oriented as compared to the X-axis and the Y-axis, said signal conditioner subjects said signals from the acceleration sensor to a strong low pass filtering, said signal conditioner determines the inclination of the monitoring device in gravity based on a measured acceleration in the X and Z directions as indicated by the strongly low pass filtered signals, said signal conditioner subjects said signals from the acceleration sensor to high pass filtering for identifying the brushing cycle as Y-acceleration indicated by the high pass filtered signal.

2. The monitoring device according to claim 1, wherein said monitoring device additionally comprises a timer which during brushing of said predetermined or user indicated teeth region measures a duration of the brushing of the teeth region in question, said memory additionally maintains a duration reference value for each teeth region, said comparator additionally comparing the duration measured by said timer during brushing of the teeth region with the corresponding duration reference value maintained in said memory, and said output device indicates that brushing of the teeth region in question has been accepted only if also the duration measured by said timer during brushing of the teeth region with a predetermined accuracy corresponds with said corresponding duration reference value.

3. The monitoring device according to claim 1, wherein said monitoring device is responsive to a predetermined user input with said input device for entering a teaching mode, wherein the signal conditioner during brushing stores at least said teeth surface specific reference values for the teeth regions in said memory for use by said comparator in comparison during subsequent toothbrushing.

4. The monitoring device according to claim 1, wherein the signal conditioner is configured to identify acceleration of the brush head in the longitudinal direction as one of the number of brushing cycles only if two accelerations in opposite directions are identified within a predetermined timeframe.

5. The monitoring device according to claim 1, wherein said signal conditioner comprises at least one filter of a type: $y(t)=y(t-1)*(1-1/k)+x(t)/k$, where $y(t)$ is output at time step t, $x(t)$ is input at time step t and k is a filter factor respectively.

6. The monitoring device according to claim 1, wherein said signal conditioner comprises at least one filter of a type: $z(t)=x(t)-y(t)$, where $z(t)$ is output at time step t, $x(t)$ is input at time step t and $y(t)$ is a low pass filtered signal respectively.

7. The monitoring device according to claim 5, wherein said at least one filter is a digital filter.

8. The monitoring device according to claim 1, wherein the monitoring device is configured to auto-calibration based on a sum of low pass filtered acceleration vector sum $a=\sqrt{(axlp^2+aylp^2+azlp^2)}=1$ g, where axlp, aylp and azlp are the low pass filtered acceleration components in orthogonal directions x, y and z respectively and g is the earth's gravity.

9. The monitoring device according to claim 1, wherein said monitoring device comprises a wireless or wired data transmission interface for taking user inputs from said input device via said interface and/or for transmitting information of the result of a comparison to said output device via said interface.

10. The monitoring device according to claim 1, wherein said output device includes at least one of the following: a LED, a display, a sound generator or a speech generator.

11. The monitoring device according to claim 1, wherein the monitoring device is configured to count a number of total accumulated toothbrushing cycles, and to indicate with the output device an end of life of the toothbrush once a brush specific preset reference number of toothbrushing cycles has been reached.

12. The monitoring device according to claim 1, wherein the monitoring device is configured to compare a present brushing acceleration spectral distribution to a brush specific preset reference distribution, and to indicate with the output device an end of life of the toothbrush based on said comparison.

13. The monitoring device according to claim 6, wherein said at least one filter is a digital filter.

* * * * *